US010265745B2

(12) United States Patent
Spoto et al.

(10) Patent No.: US 10,265,745 B2
(45) Date of Patent: Apr. 23, 2019

(54) SEAMLESS SLEEVE AND SEAMLESS SUBSTRATE

(71) Applicant: Illinois Tool Works Inc., Glenview, IL (US)

(72) Inventors: Louis M. Spoto, Hampton Falls, NH (US); Dean J. Randazzo, Chicago, IL (US); Matthew J. Deschner, Downers Grove, IL (US); William A. Herring, Valparaiso, IN (US); Shannon K. Crawford-Taylor, Merrillville, IN (US); Suwit Sangkaratana, Crown Point, IN (US); Paul R. Jelonek, Geneva, IL (US); Alan J. Varacins, Burlington, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 440 days.

(21) Appl. No.: 14/584,945

(22) Filed: Dec. 29, 2014

(65) Prior Publication Data
US 2015/0114062 A1    Apr. 30, 2015

Related U.S. Application Data

(62) Division of application No. 12/960,747, filed on Dec. 6, 2010, now abandoned.
(Continued)

(51) Int. Cl.
B21B 27/03    (2006.01)
B21B 27/00    (2006.01)
(Continued)

(52) U.S. Cl.
CPC ............ B21B 27/005 (2013.01); B21B 27/02 (2013.01); B29C 59/026 (2013.01); B31F 1/07 (2013.01);
(Continued)

(58) Field of Classification Search
CPC .................................................... B21B 27/032
See application file for complete search history.

(56) References Cited

U.S. PATENT DOCUMENTS

| 1,807,141 A | 5/1931 | Wood |
| 3,957,414 A | 5/1976 | Bussey et al. |

(Continued)

FOREIGN PATENT DOCUMENTS

| CN | 10782732 A | 7/2010 |
| JP | 56118998 | 9/1981 |
| JP | 56154599 | 11/1981 |
| KR | 20080080290 A | 9/2008 |
| WO | 03045680 | 6/2003 |

OTHER PUBLICATIONS

International Search Report for PCT/US2011/023750 dated Mar. 31, 2011.

*Primary Examiner* — Adam Krupicka
(74) *Attorney, Agent, or Firm* — Levenfeld Pearlstein, LLC

(57) ABSTRACT

A seamless, embossed or cast substrate is formed using a seamless sleeve having a seamless surface relief formed thereon and configured to slide over an cylindrical base in an embossing or casting assembly. The substrate is a flat web, foil, or film of, for example, paper, polyester, polypropylene, metal or other elongated flat material. The surface relief can be applied through interfering ablation, non-interfering ablation, ink jet printing, or other techniques wherein a seamless surface relief is formed onto the seamless sleeve. A method of making a seamless, embossed or cast substrate includes expanding a diameter of a seamless sleeve having a seamless surface relief formed thereon, sliding the expanded seamless sleeve onto a cylindrical base, allowing the diameter of the seamless sleeve to contract around the cylindrical base, and conveying a substrate through the embossing or casting assembly and embossing or casting the seamless surface relief into the substrate.

12 Claims, 2 Drawing Sheets

Related U.S. Application Data

(60) Provisional application No. 61/302,118, filed on Feb. 6, 2010.

(51) Int. Cl.

| | | |
|---|---|---|
| *B31F 1/07* | (2006.01) | |
| *B41N 6/00* | (2006.01) | |
| *B44B 5/00* | (2006.01) | |
| *B44B 5/02* | (2006.01) | |
| *B21B 27/02* | (2006.01) | |
| *B29C 59/02* | (2006.01) | |
| *B29C 59/04* | (2006.01) | |

(52) U.S. Cl.
CPC .............. *B41N 6/00* (2013.01); *B44B 5/0047* (2013.01); *B44B 5/0052* (2013.01); *B44B 5/026* (2013.01); *B29C 59/04* (2013.01); *B31F 2201/0723* (2013.01); *Y10T 29/49563* (2015.01); *Y10T 428/12292* (2015.01); *Y10T 428/12389* (2015.01); *Y10T 428/13* (2015.01); *Y10T 428/131* (2015.01); *Y10T 428/139* (2015.01); *Y10T 428/1393* (2015.01); *Y10T 428/24479* (2015.01); *Y10T 428/24521* (2015.01)

(56) References Cited

U.S. PATENT DOCUMENTS

| | | | |
|---|---|---|---|
| 4,250,135 A | | 2/1981 | Orsini |
| 4,539,392 A | * | 9/1985 | Kadoi ................. C08G 73/121 528/172 |
| 4,913,858 A | | 4/1990 | Miekka et al. |
| 4,923,572 A | * | 5/1990 | Watkins ................ B29C 59/002 205/69 |
| 5,262,879 A | | 11/1993 | Davis |
| 5,327,825 A | * | 7/1994 | Parker .................... B23P 15/24 101/28 |
| 5,521,030 A | | 5/1996 | McGrew |
| 5,706,106 A | | 1/1998 | Monaghan |
| 5,822,092 A | | 10/1998 | Davis |
| 5,889,598 A | | 3/1999 | Monaghan et al. |
| 6,173,496 B1 | * | 1/2001 | Makoui .................... B31F 1/07 29/895.21 |
| 6,486,982 B1 | | 11/2002 | Davis |
| 6,549,309 B1 | | 4/2003 | Monaghan et al. |
| 6,567,193 B2 | | 4/2003 | Monaghan et al. |
| 2002/0171883 A1 | | 11/2002 | Davis et al. |
| 2004/0031404 A1 | | 2/2004 | Dixon |
| 2005/0112472 A1 | | 5/2005 | Kutsch et al. |
| 2007/0037065 A1 | | 2/2007 | Kutsch et al. |
| 2007/0042129 A1 | * | 2/2007 | Kang .................... C25D 5/022 427/510 |

\* cited by examiner

SEAMLESS SLEEVE AND SEAMLESS SUBSTRATE

CROSS-REFERENCE TO RELATED APPLICATION DATA

This application claims the benefit of priority of Provisional U.S. Patent Application Ser. No. 61/302,118, filed Feb. 6, 2010 and is a divisional application of non-provisional U.S. patent application Ser. No. 12/960,747 filed in the United States Patent and Trademark Office on Dec. 6, 2010.

BACKGROUND OF THE INVENTION

The present invention is directed to a relief pattern on a substrate. More particularly, the present invention relates to a substrate having a seamless surface relief embossed or cast therein and a sleeve and method for making same.

Pressing a surface relief into a substrate under heat and pressure results in a "transfer" or replication of the surface relief onto the substrate. A surface relief is a structure, image, or representation of a three-dimensional (3D) relief, holographic image, diffractive pattern, non-diffractive pattern, or surface texture. A substrate is a material that can receive a surface relief, such as a continuous web of film(s), foil(s), coated film(s), coated foil(s), or coated paper or board, that may be untreated or pre-treated, as by plasma, metalizing, vacuum coating or the like, as desired. A metal or plastic shim (hereafter "shim") is often used to transfer the surface relief onto the substrate.

Typically, a shim is created as a flat sheet that is then wrapped around and attached (mounted) to a large cylindrical roller (hereafter "cylindrical base") using adhesives and/or fasteners. The cylindrical base, with the shim mounted thereon, is mounted into an embossing or casting assembly wherein an impression or replication of the surface relief is transferred from the shim onto the substrate during the embossing or casting process.

The resulting embossed or cast substrate is generally accumulated on large rolls which can be cut into smaller rolls or sheets as desired for a variety of uses such as wallpaper, wrapping paper, magazines, and the like. The roll or sheets of embossed or cast substrate also can be printed, metalized and/or laminated to board stock, plastic films, or other surfaces to create decorative, secure, and/or functional surfaces that have distinctive images, patterns, textures or color variations as the viewing angle changes.

While using shims on cylindrical bases is an effective method in producing embossed or cast substrates, there are several disadvantages to using shims. First, shims are time-consuming to prepare. Several steps, including creating an image onto a photoresist plate, plating, coating, peeling, and the like are only a few of the steps involved in producing one shim.

In addition, wrapping a flat shim around a cylindrical base leaves a void or join line where the side edges of the shim meet. Furthermore, in some cases, the cylindrical base may be of such length that one shim is insufficient to cover the entire length of the cylindrical base. Accordingly, there may be more than one flat shim required to cover the surface of the cylindrical base. When more than one shim is present, not only is a join line present where the ends of the shim meet when encircling the cylindrical base, but there are also join lines evident where the two or more shims abut one another along the width of the cylindrical base. Consequentially, with each revolution of the cylindrical base, an impression of the join line(s) is transferred into the substrate along with the surface relief. These join lines are often referred to as a repeats, interruptions, or seams (hereafter collectively referred to as "seam(s)") that are visible on the substrate. With multiple shims per cylindrical base, there can be an increasing number of seams. The multiple seams create a "parquet" effect on the embossed or cast substrate, not unlike multiple tiles on a floor.

Seams present in the final embossed or cast substrate are difficult to eliminate in the final product. Seams can be particularly noticeable in continuous holographic or textured patterns and are highly undesirable.

Therefore, in order to ensure that seams do not appear as flaws or defects in an end product, when cutting the embossed or cast substrate, downstream converters are forced to calibrate and register or index equipment to avoid incorporating the seams into the end product. Having to work around the seams increases the material scrap; a great deal of waste is produced in addition to the inconvenience of having to calibrate machinery to avoid the transition areas while cutting the embossed or cast substrate to size.

Furthermore, once the shims have been used in the embossing or casting processes, the shims are difficult to remove from the cylindrical base when the shim is no longer useful. The shim needs to be scraped off the cylindrical base in order for the cylindrical base to be prepared for a different shim. The used shim cannot be recovered or stored and is no longer useful as a shim. Once removed, the shim is then discarded as waste or recycled and the cylindrical base needs to scrubbed and prepared to host a new shim.

Efforts to reduce reliance on shims included forming the surface relief directly onto a photoresist material on the cylindrical base itself. Unfortunately, photoresist or other typical material used cannot withstand high temperature. Usually, the photoresist or other materials can only endure temperatures of less than 150 degrees Celsius; in addition, the embossing or casting cylinder and resultant embossed or cast substrate has less durability than perhaps is desired. Another method involved etching a surface relief directly onto the cylindrical base. In both cases, however, the cylindrical base cannot be reused for other patterns once the surface relief formed thereon is no longer useful. In addition, the size, weight, and cost of cylindrical bases makes forming the surface relief directly on the cylindrical base impractical.

Accordingly, there is a need for an embossed or cast substrate having no seams. Desirably, such an embossed or cast substrate is formed using an embossing media that is easy to manufacture, cost effective, easily removed, storable, and reusable, while minimizing necessary cleaning and maintenance of associated machinery.

BRIEF SUMMARY OF THE INVENTION

A seamless, embossed or cast substrate is formed using a seamless sleeve having a seamless surface relief formed on an exterior surface of the sleeve. The seamless sleeve is cylindrical in shape and is configured to slide over a cylindrical base in an embossing or casting assembly. The surface relief is seamlessly formed along a length of the substrate. A "seamless" surface relief refers to a continuous, uninterrupted surface relief pattern having no seams, repeat lines, or join lines. The substrate is a flat web, foil, or film of, for example, paper, polyester, polypropylene, metal or other elongated flat material into which a surface relief can be formed. The substrate, in one embodiment, has a coating or other surface preparation thereon to enable or facilitate embossing or casting of the surface relief.

A sleeve for use with an embossing or casting assembly having a cylindrical base has a seamless surface relief applied on an exterior surface of the sleeve. The surface relief can be applied to the sleeve through interfering ablation, non-interfering ablation, ink jet printing, or other techniques wherein a surface relief is formed (e.g. impressed, etched, microetched, applied, brushed, engraved, created, cast or otherwise applied) onto an exterior surface of the sleeve. The surface relief is formed directly onto/into the exterior surface of the sleeve in one embodiment, while in another embodiment, the surface relief is formed in or on a coating applied on the exterior surface of the sleeve.

The sleeve can be a metal such as nickel or aluminum, but may also be a ceramic, polymer, thermopolymer (e.g. polyvinylchloride (PVC)), or other suitable material. In one embodiment, the coating is uniformly applied and has a thickness, in one example, of 18-25 microns. The coating may be, for example, a polyimide, gelatin, or an ultraviolet (UV) or electron beam (EB) curable coating.

A method for coating a seamless sleeve with a coating includes inserting the sleeve into a variable controlled air motor rotisserie and spraying the sleeve with the coating while rotating the sleeve to form a uniform coating thickness. A spraying apparatus is mounted to an automated linear movement to apply the coating. In another embodiment, the coating is sprayed on manually or applied using for example, a paint, annular ring system/coater, blade system, dip coating, or application roller system. The coating is applied over all or almost all of a length of the sleeve and around the entire circumference of the sleeve in order to form a coating of generally uniform thickness on the sleeve.

A method of making a seamless, embossed or cast substrate in an embossing or casting assembly includes expanding slightly the diameter of the seamless sleeve having the seamless surface relief formed thereon and sliding the expanded seamless sleeve onto a cylindrical base. The diameter of the seamless sleeve is allowed to contract around the cylindrical base. A substrate is then conveyed or passed through the embossing or casting assembly over the seamless sleeve and the seamless surface relief is seamlessly embossed or cast into the substrate.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
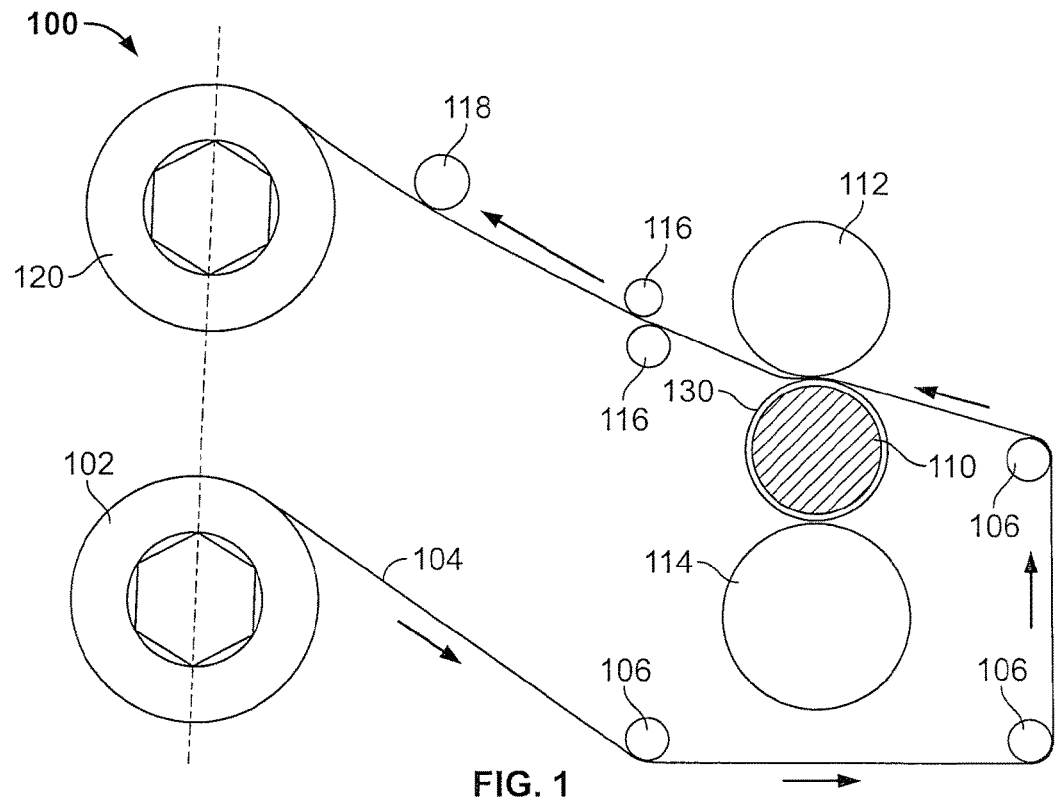
FIG. 1 is a side view of a system for seamlessly embossing or casting a substrate in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

The present invention eliminates the need for the commonly used flat shim in favor of a seamless sleeve that slides easily over the surface of an cylindrical base in an embossing or casting system. A surface relief is a structure, image, or representation of a 3D relief, holographic image, diffractive pattern, non-diffractive pattern, or surface texture. A substrate is a material that can receive a surface relief, such as, for example, a continuous web of films, foils, coated films, coated foils, or coated paper or board.

Figure 2:
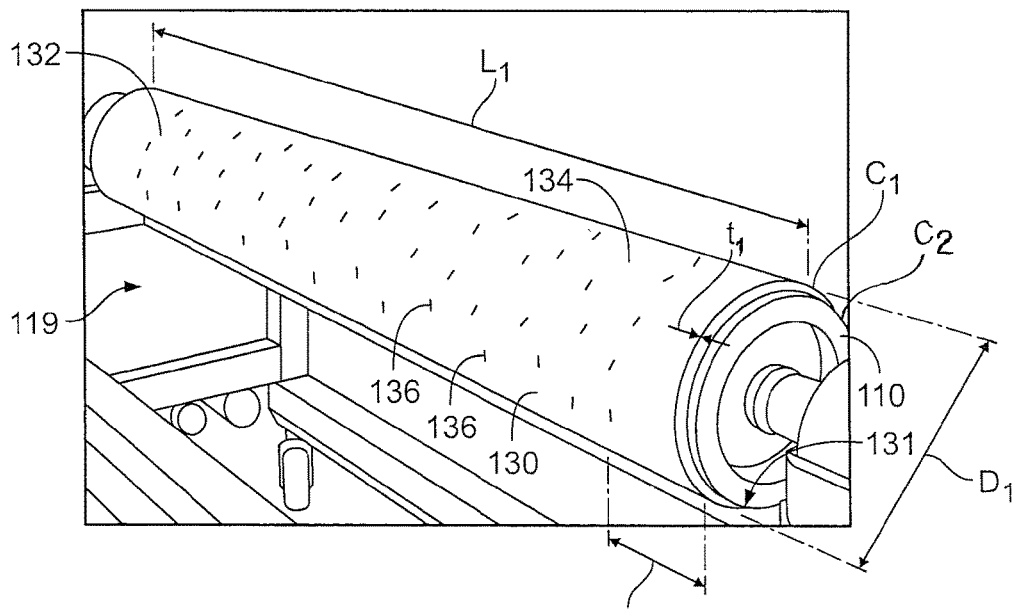
FIG. 2 a perspective view of a sleeve mounted on a cylindrical base to form an embossing or casting roll.

Referring now to FIGS. 1 and 2, a seamless embossing or casting assembly or system 100 for embossing or casting on a substrate 104, is shown. It will be appreciated by those skilled in the art that FIG. 1 is intended to illustrate embossing and casting systems in general and that other embodiments of the system 100 are anticipated and contemplated and within the scope of the present disclosure.

The embossing or casting system 100 includes a supply reel 102 having a supply of substrate 104 for the embossing or casting system 100. The substrate 104 is conveyed around one or more web rollers 106 and enters a nip formed between the cylindrical base 110 having a seamless sleeve 130 thereon (wherein the cylindrical base having a sleeve thereon is hereafter collectively referred to as an "embossing or casting roll" 119), and a roller 112. A pressure roller 114 may also be present. The substrate 104 is seamlessly embossed or cast with a surface relief identical or similar to that present on the seamless sleeve 130. The now-embossed or cast substrate 104 is gathered or accumulated on a take-up reel 120. The embossed or cast substrate 104, on take-up reel 120, can be further processed downstream, such as by vacuum metalizing, plasma treating, coating, painting, laminating, slitting, sheeting, die cutting and/or otherwise treated to form a desired effect or product.

An embodiment of the seamless sleeve 130 for use in the above described seamless embossing or casting system 100 is shown in greater detail in FIG. 2. The seamless sleeve 130 is a metal, polymeric, thermopolymeric (e.g. PVC), or ceramic cylinder having an interior surface 131 and an exterior surface 134. The seamless sleeve 130 is hollow and has a length $L_1$, a diameter $D_1$, and a wall thickness $t_1$. The circumference C of seamless sleeve 130 can be any dimension; in one example, the circumference is between ten (10) inches and thirty (30) inches. In another example, the length $L_1$ of the seamless sleeve 130 is between twenty-five (25) and sixty-six (66) inches or more, while a diameter $D_1$ is between three (3) and ten (10) inches. It will be appreciated by those skilled in the art that a seamless sleeve 130 may be created having dimensions different than those described, and are within the scope of the present disclosure.

In an embodiment, the seamless sleeve 130 has no coating on the exterior surface 134. In another exemplary embodiment, the seamless sleeve 130 has a coating 132, such as a laser-ablatable coating (e.g., a UV or EB curable or polyimide material). In another embodiment, the coating 132 is a non-ablatable—type coating capable of having a surface relief formed thereon. The seamless sleeve 130 can be coated by means of a spray, e.g., manually or automatically spraying or applied using for example, a paint, annular ring system/coater, blade system, dip coating, or application roller system and may be dried and/or cured. The coating is applied over all or almost all of a length of the sleeve and around the entire circumference of the sleeve in order to form a coating of generally uniform thickness on the sleeve. In a casting application, to replicate the relief surface, a curable liquid (e.g., a UV or EB curable monomer/oligomer mixture or the like), is uniformly applied to the relief pattern or the substrate surface and the two layers are brought together through a nip (e.g., between rollers) to intimately contact the coating between the surfaces and the coating is cured, preferably but not necessarily before separating the substrate from the relief surface. In this manner, the relief surface is replicated in situ, by the cure coating, and will have adhered itself to the substrate.

The coating 132 on the seamless sleeve 130 possesses, or is configured to possess, physical and/or chemical properties, as appropriate, such as: low surface energy, ease of processing (the ability to coat or spray), heat stability (withstand temperatures of up to 280 degrees Celsius or more), chemical resistance, mechanical durability, and increased adhesion/affinity to the sleeve material. In addition, the coating 132 has or is configured to have the ability to be ablated, optically imaged, or laser etched. In an exemplary embodiment, the coating has flexibility/elasticity to accommodate expansion and contraction of the seamless sleeve without damaging the surface relief or causing a loss of adhesion of the coating to the sleeve. Furthermore, the coating 132 can be configured to assist or facilitate in the control of the surface energy of the seamless sleeve 130.

The groups of polymers that can be utilized to meet the different performance levels required through the sleeve coating, ablating, imaging and casting/embossing processes can be selected from several tiers of polymers; for example, the family known as 'Ultra' polymers may be used for more demanding applications. For less demanding situations, the class of 'Engineering' polymers may also be successfully employed.

A seamless surface relief 136 is formed on the outer or exterior surface 134 of the seamless sleeve 130, along almost all or all of the entire length $L_1$ of the seamless sleeve 130, and along the circumference $C_1$ of the seamless sleeve 130. The surface relief 136 may be any text or graphic, micro-etch, three dimensional relief, holographic image, diffractive and non-diffraction patterns and/or surface texture which can be embossed or cast onto a substrate. Such surface reliefs may be obtained from photographs, digitally created images, paintings, other textured surfaces and the like.

The surface relief 136 is formed on the exterior surface 134 of the seamless sleeve 130 through interference ablation techniques or non-interference ablation techniques either directly onto the surface 134 of the seamless sleeve 130 or onto the coating 132 on the surface 134 of the seamless sleeve 130. The seamless sleeve 130 is rotated while simultaneously being advanced to create a seamless (e.g. continuous, uninterrupted) surface relief 136 along the entire circumference, and along at least a portion of the length $L_1$ of the seamless sleeve 130.

Figure 3:
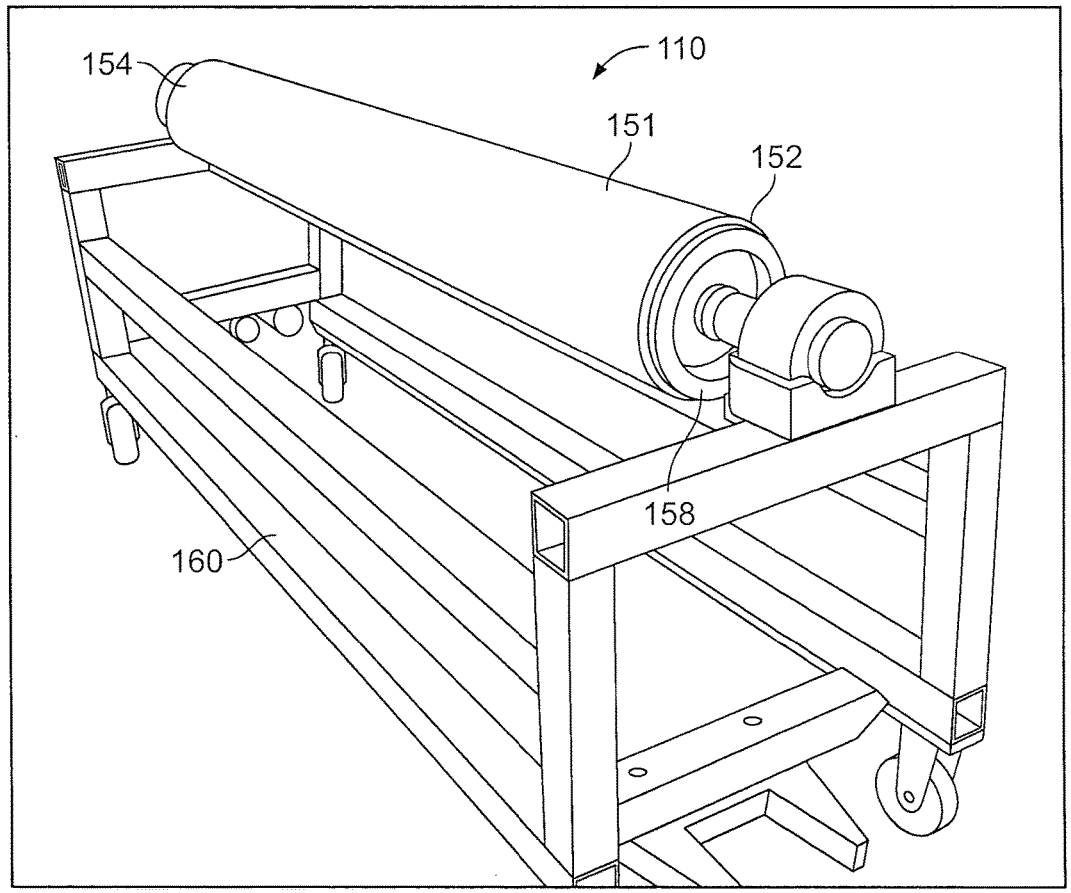
FIG. 3 is a perspective view of the cylindrical base.
Figure 4:
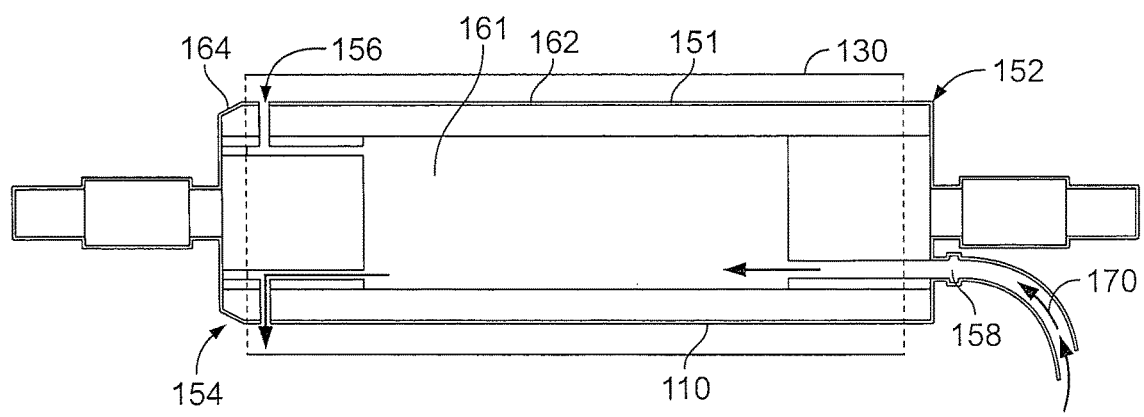
FIG. 4 is a cross-sectional view of FIG. 2.

Turning now to FIGS. 3 and 4, the cylindrical base 110 is cantilevered, having a first end 152 and a second end 154. The first end 152 is free while the second end 154 is connected to a frame 160 of the embossing or casting assembly 100 (shown in FIG. 1).

The first end 152 of the cylindrical base 110 has a quick connect air intake 158 and pin holes 156 located circumferentially around the second end 154 in fluid communication with an interior 161 and an exterior 162 of the cylindrical base 110. The pin holes 156 in an exemplary embodiment, are about 3/32 inch in diameter and are equally spaced about the circumference $C_2$ of the cylindrical base 110. The pin holes 156 are positioned near the second end 154. In addition, the second end 154 has a beveled edge 164 having a length of about 0.25 inches and formed at an angle about 20 degrees from the horizontal.

The method of producing a seamless, embossed or cast substrate 104 as disclosed above includes sliding the seamless sleeve 130 onto the cylindrical base 110 using an "air-greased" type mechanism. The quick connect 158 of the cylindrical base 110, along with the pin holes, nozzles, or apertures 156 (hereafter "pin holes" 156) along the wall of the cylindrical base 110, allow air or other gas 120 to travel through the center or interior 161 of the cylindrical base 110 and out the pin holes 156. The force of the air or gas through the pin holes 156 expands the walls of the seamless sleeve 130, making the seamless sleeve 130 slightly larger in diameter than the diameter of the cylindrical base 110 and enables the seamless sleeve 130 to easily slide onto the cylindrical base 110. Once positioned on the cylindrical base 110, the air pressure is removed or deactivated and the seamless sleeve 130 contracts to fit the cylindrical base 110 snugly.

The seamless sleeve 130 is removed from the cylindrical base 110 as it has been put on: an air grease nozzle is produced, expanding the sides/diameter of the seamless sleeve 130 slightly in order to slide the seamless sleeve 130 from the cylindrical base 110. After removal, the seamless sleeve 130 may then be stored and/or reused.

In another embodiment, the coating is stripped from the seamless sleeve, and the seamless sleeve can be re-coated and re-used. In yet another embodiment, the coated sleeve would not be stripped, but rather, a new layer of coating may be applied over the previous coating, and a new surface relief is formed in the new coating. In yet another example, an already imaged sleeve can be replicated by embossing or casting another sleeve into a sleeve coated with the same material, effectively producing a positive image from a separately formed negative image. In still yet another example, a relief surface can be created by embossing a standard shim into the surface using known techniques of feathering and/or hiding the seam.

The advantages of the present seamless substrate, seamless sleeve and method for making a seamless substrate using the seamless sleeve will be apparent to those skilled in the art. The present apparatus and method eliminates use of flat shims and their many inherent disadvantages not least of which are undesirable seams. In addition, the sleeve of the present invention is easily removable from the cylindrical base, easily storable, and conveniently reusable, reducing waste and providing an efficient and cost-effective alternative to metal shims. Furthermore, such a method is 25% faster than traditional embossing or casting preparation and produces a brighter, more vibrant product. The sleeve and cylindrical base are able to be used for longer periods of time without maintenance or cleaning.

Using a seamless sleeve instead of a shim also saves time in loading and unloading of the sleeve when compared to shim preparation, and adhesion to and removal from the cylindrical base. With the present apparatus and method, no developing of an image and no secondary plating is required, as is required in shim preparation. Most importantly, however, the sleeve and method of making and using same produces a seamless embossed or cast substrate forming an unlimited length of substrate seamlessly, where the width of the surface relief on the substrate depends only on the length of the sleeve.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A seamless sleeve for use with a cylindrical base in an embossing or casting assembly comprising:
    a seamless sleeve having an exterior surface and a coating on the exterior surface, wherein the coating is a spray or paint and is applied using an annular ring coater, a blade system, dip coating, or an application roller system, and is cured on the seamless sleeve; and
    a seamless surface relief applied on the coating, the seamless sleeve configured to slide over the cylindrical base in the embossing or casting assembly,
    wherein the coating has a thickness of 18-25 microns.

2. The seamless sleeve of claim 1 wherein the surface relief is formed on the coating through interfering ablation, non-interfering ablation, micro-etching, or ink jet printing.

3. The seamless sleeve of claim 1 wherein the coating is laser-ablatable.

4. The seamless sleeve of claim 3 wherein the laser ablatable coating is UV or EB curable.

5. The seamless sleeve of claim 3 wherein the laser ablatable coating is a polyimide or gelatin coating.

6. The seamless sleeve of claim 1 wherein an exterior surface of the coating is directly laser-ablatable.

7. The seamless sleeve of claim 1 wherein the seamless sleeve is formed of a metal.

8. The seamless sleeve of claim 7 wherein the sleeve is nickel.

9. The seamless sleeve of claim 1 wherein the seamless sleeve is formed of a ceramic or polymeric material.

10. A seamless sleeve for use with a cylindrical base in an embossing or casting assembly comprising:
    a hollow sleeve body having an interior surface and an exterior surface, the hollow sleeve body having an inner diameter configured to fit around the cylindrical base;
    a coating on the exterior surface, wherein the coating is uniformly applied having a thickness of 18-25 microns; and
    a seamless surface relief formed on the coating by rotating the hollow sleeve body while simultaneously advancing by an ablating mechanism.

11. The seamless sleeve of claim 10, wherein the hollow sleeve body is cylindrical.

12. A method of making a seamless, embossed or cast substrate in an embossing or casting assembly comprising:
    expanding a diameter of the seamless sleeve of claim 1 having a seamless surface relief formed thereon;
    sliding the expanded seamless sleeve onto a cylindrical base;
    allowing the diameter of the seamless sleeve to contract around the cylindrical base; and
    conveying a substrate through the embossing or casting assembly and embossing or casting the seamless surface relief into the substrate.

* * * * *